United States Patent [19]

Lopata

[11] Patent Number: 5,445,065
[45] Date of Patent: Aug. 29, 1995

[54] SELF CENTERING MEANS OF A PLANETARY GEAR SYSTEM FOR ROTISSERIE

[76] Inventor: Ira L. Lopata, 234 Eden Rd., Palm Beach, Fla. 33480

[21] Appl. No.: 347,924

[22] Filed: Dec. 1, 1994

[51] Int. Cl.⁶ .............................................. A47J 37/04
[52] U.S. Cl. ...................... 99/421 H; 99/419; 99/448
[58] Field of Search ............. 99/339, 340, 419–421 V, 99/426, 427, 448–450, 482, 532; 126/41 B, 25 R, 9 R

[56] References Cited

U.S. PATENT DOCUMENTS

| | | | |
|---|---|---|---|
| 472,595 | 4/1892 | Wachs | 99/421 H |
| 652,660 | 6/1900 | Bradlee | 99/421 H |
| 2,245,220 | 6/1941 | Nelson | 99/421 H |
| 2,762,293 | 9/1956 | Boyajian | 99/421 P |
| 3,125,015 | 3/1964 | Schlaegel | 99/421 P |
| 3,196,776 | 7/1965 | Norton | 99/421 P |
| 3,744,403 | 7/1973 | Castronuovo | 99/421 V |
| 4,258,617 | 3/1981 | Akwei | 99/419 |
| 4,409,452 | 10/1983 | Oouchi et al. | 126/41 B |
| 4,985,607 | 1/1991 | Oya | 126/238 |
| 5,184,540 | 2/1993 | Riccio | 99/419 |
| 5,367,950 | 11/1994 | Sarich | 99/449 |

Primary Examiner—Timothy F. Simone
Attorney, Agent, or Firm—Norman Friedland

[57] ABSTRACT

The bull gear in the planetary gear system of a rotisserie is mounted on the shaft of the reel plates and held stationary for rotating the plantetary gears and maintaining them in a coplanar relationship. The bull gear is biased by a spring having its free end bearing against the face of the bull gear to urge it axially toward the reel plate. The bull gear and planet gears are selected so that the rotational speed of the skewer driven by the planet gear and the orbital speed of the reel plate are such that the same angular location of the skewer passes the same angular location of the heater once every five orbits.

5 Claims, 4 Drawing Sheets

SELF CENTERING MEANS OF A PLANETARY GEAR SYSTEM FOR ROTISSERIE

CROSS REFERENCES

This invention relates to the subject matter disclosed in copending patent application (Ser. No. 08/347,923) filed on even date by the inventor common to this patent application and entitled "Skewer Driver for Rotisserie" and in copending patent application (Ser. No. 08/347,922) filed on even date by the inventor common to this patent application and entitled "Skewer for Rotisserie"

TECHNICAL FIELD

This invention relates to rotisseries for cooking chickens and like foods and particularly to the construction of the planetary gearing system so as to maintain concentricity of the gears.

BACKGROUND ART

As it is well known commercial rotisseries for cooking chickens and like foods has grown in popularity over the last several years and because of the heavy usage and high temperature operation the designer of this type of equipment is confronted with problems that concern the wear, maintainability, concentricity, ease of operation, efficiency and flavor imparted to the chicken. Examples of rotisseries that exemplify the commercial types of rotisseries that shares common concerns with the present invention are disclosed in U.S. Pat. No. 5,136,933 granted to Riccio on Feb. 9, 1993 entitled "Cooking Apparatus with Rotisserie and Reclamation Trap", U.S. Pat. No. 5,136,933 granted to Derakhshan on Aug. 11, 1992 and entitled "Rotary Orbital Rotisserie" and U.S. Pat. No. 4,214,516 granted to Friedl et al on Jul. 29, 1980 entitled "Barbecue Oven". In these prior art rotisseries the spit or skewer is rotated about its own axis and orbits about the rotisserie oven by virtue of spaced drums or reel plates that are mutually rotated and horizontally support the skewer for rotary motion. In each instance the skewer end is inserted in a driver that is attached to the reel plate and is connected to a planet gear or other mechanism that rotates the individual skewer.

The concern of this invention is the planetary system that serves to rotate each of the skewers about their own axis. In order to assure that the axis of the skewer remains in its track and remains concentric it is important that the gears in the individual gears in the planetary gear system remain co-planar. This not only improves the wear and tear of the components but also assures that the chicken will remain in its spatial relationship relative to the high temperature burner so as to not adversely affect the taste of the chicken. Additionally, the rotation of the skewer is controlled so that the chicken passes at a different angular location relative to the burner at each revolution for one complete cycle.

I have found that by mounting the bull or sun gear of the planetary gear system coaxilly with the shaft of the reel plates and rotatably supporting the shaft by a bearing attached to the hub of the bull gear so that the shaft rotates relative to the bull gear the gears in the planetary gear system will remain co-planar. This also assures even wear on the rotating parts.

I provide a helical spring biasing the bull or sun gear in the planetary gear train so that the gears remain coplanar which may otherwise not occur due to the manufacturing and tolerances of the rotisserie.

SUMMARY OF THE INVENTION

An object of this invention is to provide for a rotisserie the judicious location of the bull gear of the planetary system for maintaining the gears of the planetary system in a constant co-planar condition.

A feature of this invention is to mount the shaft driving the reel plates on a bearing mounted in the center of the bull gear.

Another feature of this invention is to include spring means for biasing the bull gear toward the adjacent reel plate.

Another object of this invention is to select the gear ratio between the bull gear and planetary gear system to control the relationship between the chicken and burner to avoid searing the chicken in one location.

The foregoing and other features of the present invention will become more apparent from the following description and accompanying drawings.

DETAILED DESCRIPTION OF THE PREFERRED EMBODIMENT

While in its preferred embodiment the rotisserie of this invention is being described in conjunction with a commercial type of rotisserie, as one skilled in this art will appreciate, this planetary gear system has utility for other types of rotisseries. Additionally, it will be appreciated that in certain commercial rotisseries, double ovens with like amount of skewers are mounted in side-to-side relationship.

Figure 1:
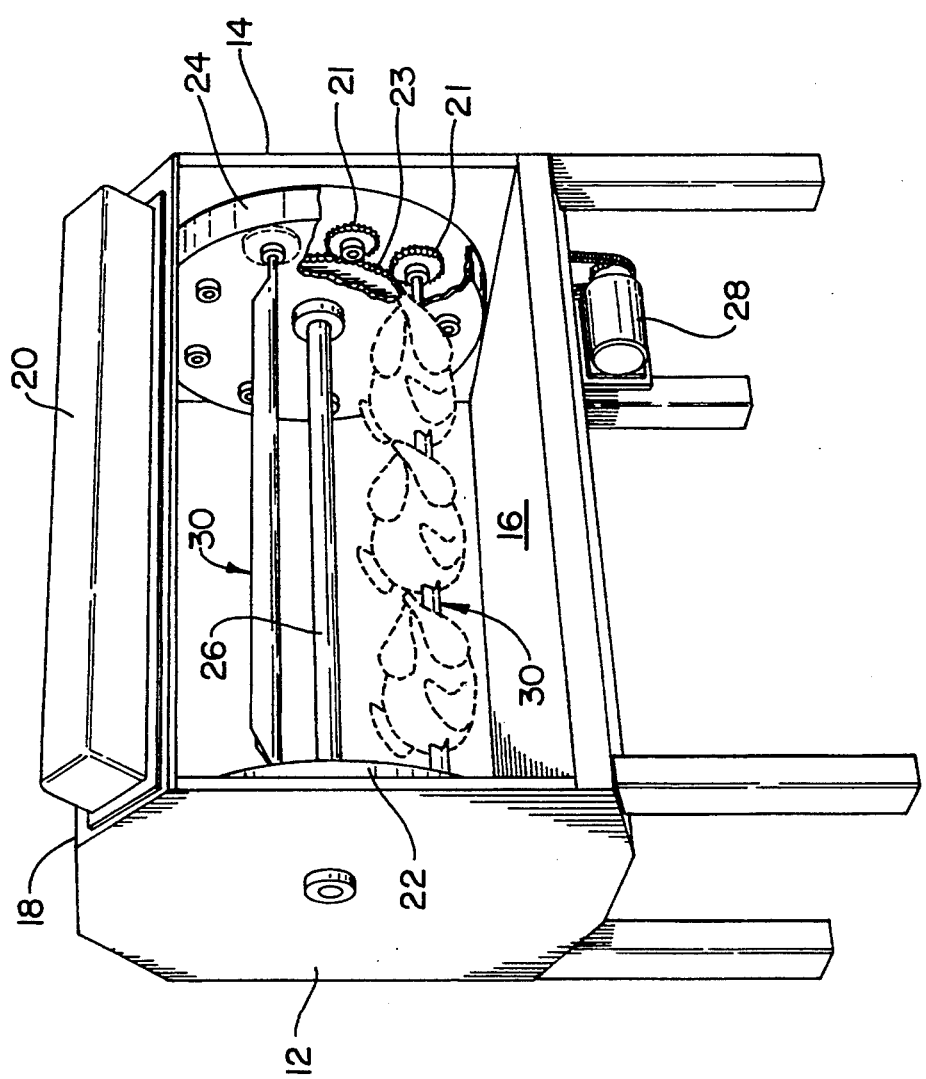
FIG. 1 is a schematic view in perspective illustrating the rotisserie with two skewers mounted therein.
Figure 2:
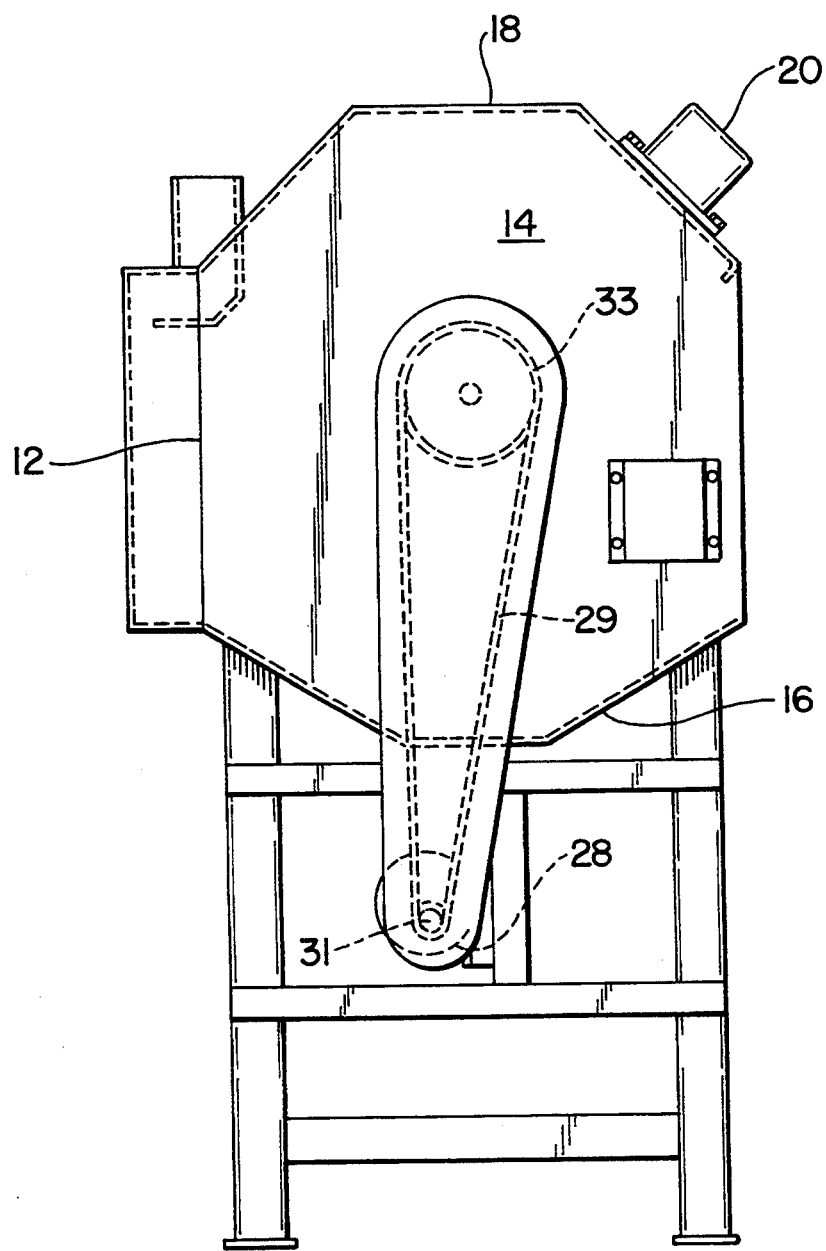
FIG. 2 is a side elevation view of the rotisserie showing the driving mechanism.
Figure 3:
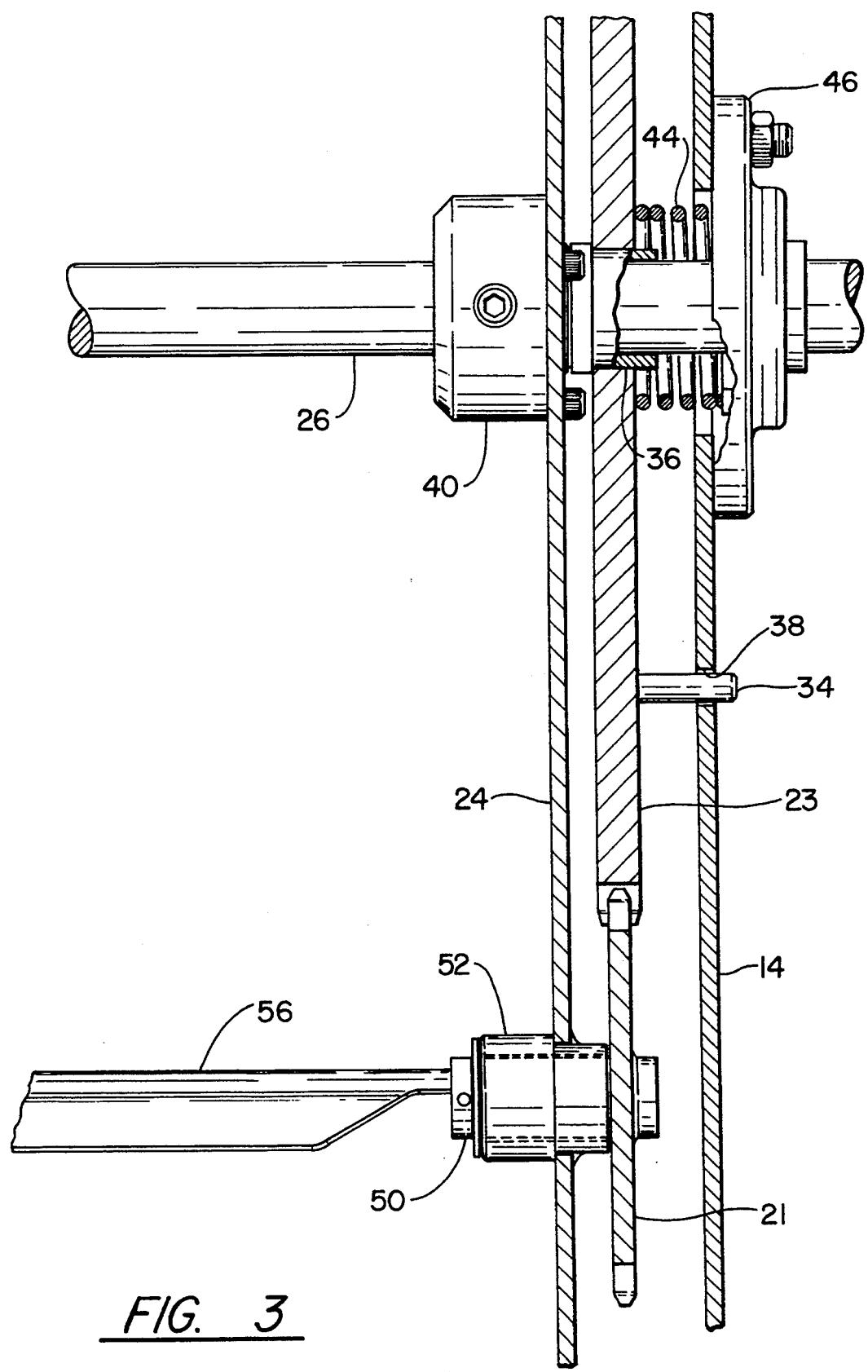
FIG. 3 is a partial view partly in section and partly in elevation illustrating the details of this invention.

Reference is now being made to FIGS. 1–3 which disclose in detail the construction of the planetary system of the rotisserie. First, looking at FIG. 1 which is a schematic view of the rotisserie and the skewer, it will be noted that the rotisserie is an open type of oven generally indicated by reference numeral 10, having the opposite side walls 12 and 14, bottom wall 16 and the top wall 16 supported to the legs. Fitted to the top wall is a gas fired heater 20 of the type that generates substantially 1600 degrees fahrenheit that is mounted on a bias in the front end of the oven. A suitable burner is described in U.S. Pat. No. 4,927,355 granted to Haire et al on May 22, 1990 and entitled "Burner Assembly". A pair of rotating drums or reel plates 22 and 24 axially spaced relative to each other are supported to shaft 26 that is journalled in the bearings (not shown) supported in the apertures and formed in the side walls 12 and 14 for rotary motion. A suitable electric motor 28 and belt or chain 29 are suitably connected to a drive pulley or sprocket gear 31 connected to driven pulley or sprocket gear 33 for imparting continuous rotary motion to shaft 26 and reel plates 22 and 24. A plurality of planet gears 21 rotatably supported to the reel plate 24 mesh with the bull or sun gear 23 that is suitably restrained from rotating by side wall 14. As the reel plates 22 and 24 rotate by virtue of the motor 28 about central axis of shaft 26, the individual planet gears meshing with the teeth of sun gear or bull gear 23, rotate relative to the reel plates 22 and 24 causing the chickens to orbit in the cooking compartment of the rotisserie and rotate about the skewers that rotate relative to the reel plates. In this construction a different portion of the chickens face the heater 20 and its full intensity for each revolution until a full cycle, which say, may be every five revolutions of the reel plates, is attained. This not only effectuates even roasting, but also prevents overcooking any one portion of the chicken.

Figure 2B:
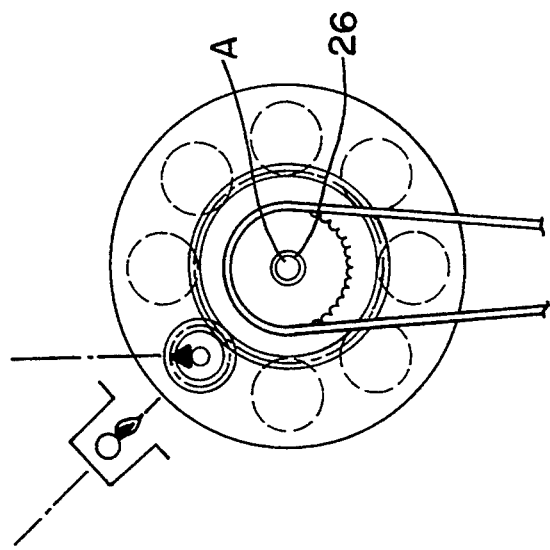
FIG. 2B is a schematic view identical to the view exemplified in FIG. 3A after a single revolution of the reel plate.
Figure 2A:
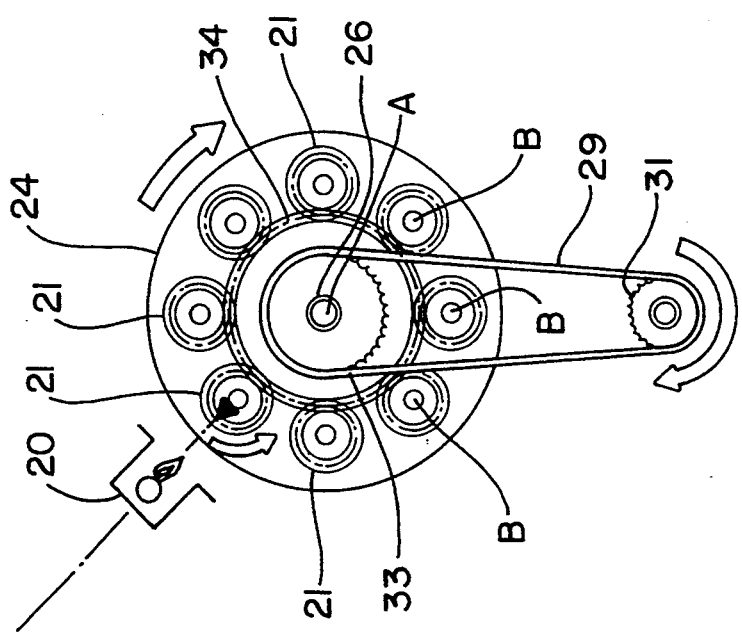
FIG. 2A is a schematic view of the planetary gear system illustrating the position of the skewer relative to the burner for a given rotation of the reel plate.

As noted in FIGS. 2A and 2B, as the planets orbit about the rotating axis A the meshing gears between the planet gears 21 and the stationary bull gear 34 causes the planet gears 21 to rotate around its rotating axis B. As shown in FIG. 2A the arrow head C is in a given position relative to burner. The arrow head C represents the position of the chicken relative to the burner 20. After a complete revolution of the reel plate 24, the arrow head C is now in a different position relative to the heater. These positions are controlled by the proper selections of the number of teeth in the planet gears and bull gear and in this preferred embodiment the arrow head C returns to the position shown in FIG. 2A after the skewer has orbited in the oven five (5) times.

In accordance with this invention and as best seen in FIG. 3 the bull gear 34 is supported to shaft 26 which is disposed between the side wall and reel plate 24. The shaft 26 is rotatably mounted in the bushing 36 that is affixed to the center aperture of bull gear 34. The reel plate 24 is attached to shaft 24 by the collar 40 and rigidly connected thereto by the set screw 42 such that the reel plate 24 rotates with shaft 26. The bull gear 34 is held stationary by the pin 35 attached to the front face of the bull gear and extending into the aperture 38 formed in the side wall 14. Hence, the planet gears 21 in mesh with the bull gear 34 are caused to rotate as the reel plate 24 rotates. By virtue of this arrangement of the bull gear 34 the components of the planetary system remain co-planar.

The bull gear 34 is biased axially toward the reel plate 24 by the helical spring 44 which has one end bearing against the front face of bull gear 34 and the other end being retained and held fixed by retainer 46. Retainer 46 is attached to side wall 14 by a plurality of stud bolt and nut assemblies 48 (only one being shown) circumferentially spaced about the retainer 46. Obviously, the helical spring serves to compensate for design considerations andtolerances that occur in the manufacturing of the rotisserie by virtue of the free end of the spring 44 adjusting the bull gear 34.

Each of the planet gears 21 are affixed to stub shaft 50 rotatably supported in bushing 52 that is affixed to the reel plate 24. Only one planet gear is being described herein for the sake of convenience and simplicity as all of the planet gears and their connections are identical. The skewer 56 adapted to support the chickens in the oven of the rotisserie fits into the socket formed on the end of stub shaft 50. The reel plate 24 serves to orbit the skewer 56 and the planet gear serves to rotate the skewer about its own axis.

By virtue of the judicious location and mounting of the bull gear 34, the planetary gear system remains coplanar. In addition the bull gear is biased in a given position to facilitate in the design and manufacturing of the rotisserie.

Although this invention has been shown and described with respect to detailed embodiments thereof, it will be appreciated and understood by those skilled in the art that various changes in form and detail thereof may be made without departing from the spirit and scope of the claimed invention.

I claim:

1. For a rotisserie having spaced walls and a top wall and bottom wall defining an oven for cooking chickens or like foods therein, a burner attached to top front portion of the oven and oriented to face the rear bottom portion of the oven, a central shaft rotatably supported in said oven, at least a pair of spaced reel plates mounted on said central shaft and rotated therewith for orbital move, at least one skewer horizontally supported in said pair of reel plates for orbital and rotary motion, a planetary system for imparting rotary motion to said skewer, said planetary gear system including a plurality of planet gears circumferentially spaced around the outer face of one of said pair of reel plates, a fixed bull gear in mesh relationship with said planet gears mounted on said central shaft, a bushing centrally mounted in said bull gear for allowing said shaft to rotate relative to said bull gear, means for holding said bull gear in a fixed position to impart rotary motion to said planet gears as said reel plate orbits in said oven.

2. For a rotisserie as claimed in claim 1 wherein said means for holding said bull gear in a fixed position includes a pin extending axially from said bull gear and extending in an aperture formed in one of said spaced walls.

3. For a rotisserie as claimed in claim 2 wherein the number of teeth of said planet gears and the number of teeth of said bull gear defines a gear ratio for controlling the relative speed in revolutions per minute of said planet gears relative to the speed of the orbiting reel plate.

4. For a rotisserie as claimed in claim 3 including resilient means bearing against a face of said bull gear and biasing said bull gear in an axial direction.

5. For a rotisserie as claimed in claim 4 wherein said resilient means is a helical spring.

* * * * *